United States Patent [19]
Scott

[11] Patent Number: 5,950,136
[45] Date of Patent: Sep. 7, 1999

[54] SYSTEM AND METHOD FOR ROUTING DATA CALLS IN A CELLULAR NETWORK

[75] Inventor: Robert Earl Scott, Indian Rocks Beach, Fla.

[73] Assignee: Paradyne Corporation, Largo, Fla.

[21] Appl. No.: 08/781,155

[22] Filed: Jan. 8, 1997

[51] Int. Cl.$^6$ .................................................. H04Q 7/20
[52] U.S. Cl. ..................... 455/452; 455/450; 455/509; 455/445
[58] Field of Search ..................................... 455/422, 426, 455/445, 450–452, 454, 455, 509, 516, 518, 519, 560; 370/329, 341, 493–495

[56] References Cited

U.S. PATENT DOCUMENTS

| | | | |
|---|---|---|---|
| 5,280,630 | 1/1994 | Wang | 455/452 |
| 5,418,839 | 5/1995 | Knuth et al. | 455/464 |
| 5,504,939 | 4/1996 | Mayrand et al. | 455/450 |
| 5,734,678 | 3/1998 | Paneth et al. | 455/509 |

*Primary Examiner*—Dwayne D. Bost
*Assistant Examiner*—Nay A. Maung
*Attorney, Agent, or Firm*—Thomas, Kayden, Horstemeyer & Risley, L.L.P.

[57] ABSTRACT

A channel routing manager that is employed by a mobile telecommunications switching office routes voice and data calls over a carrier facility interconnecting a cell site transceiver to the mobile cellular switch and includes first and second channels that utilizes first and second encoding methods, respectively. The channel routing manager comprises a hunt group mechanism including first and second channels, wherein the first channels are sorted together and the second channels are sorted together. In addition, the channel routing manager comprises a control mechanism for routing the voice calls to one of the first channels unless all of the first channels are busy and then routing the voice calls to one of the second channels, and for routing the data calls to one of the second channels unless all of the second channels are busy and then routing the data calls to one of the first channels. In a first embodiment of the hunt group mechanism, the hunt group mechanism comprises a dual-fixed order hunt group with the first channels at a first end beginning with a lowest channel number and the second channels at a second end beginning with a highest channel number, whereby voice calls are routed to the lowest available channel and data calls are routed to the highest available channel. In a second embodiment, the hunt group mechanism comprises opposing first and second fixed order hunt groups, wherein the first fixed order hunt group begins with the first channels and ends with the second channel, and the second fixed order group begins with the second channel and ends with the first channels. In the second embodiment, the voice calls are routed to the first fixed order group and the data calls are routed to the second fixed order hunt group. In a preferred embodiment, the first channels utilize voice compression schemes and the second channels utilize uncompressed encoding schemes.

25 Claims, 6 Drawing Sheets

SYSTEM AND METHOD FOR ROUTING DATA CALLS IN A CELLULAR NETWORK

FIELD OF THE INVENTION

Present invention generally relates to mobile data communications and, more particularly, to routing data calls on a carrier facility interconnecting a cell site transceiver and a mobile telecommunications switching office.

BACKGROUND OF THE INVENTION

In recent years, the popularity and growth of cellular communication has increased in dramatic fashion. In fact, current cellular networks are being continually pressed to keep up with the demands for increased capacity and more reliable service. One of the fastest growing parts of the cellular communication market is the transmission of data over cellular networks. The users of cellular services are more and more combining the functionality of portable data terminal equipment (DTE), e.g., a lap-top personal computer or personal digital assistant, with cellular data communication equipment (DCE), e.g., a modem coupled to a cellular phone, in order to serve both professional and personal needs. It has recently been suggested that approximately 3% of the cellular calls made in North America are data calls, and all indications are that this number will only increase in the future. Accordingly, the growth of this data communication market is placing additional demands on the current cellular networks to provide faster and faster data rates. While present day modems are able to transmit data at rates up to 33,600 bits per second (bps) over land-line communication channels, such speeds are not yet achievable in cellular communication because of Rayleigh fading, co-channel interference, etc., which essentially increase the error rate by increasing the noise on the cellular channel. Those in the art have realized that one way to improve data transmission rates in the cellular environment is to use a data protocol that is better suited to combating the effects of the cellular environment over the cellular portion of the data connection. One example of a cellular oriented protocol is the Enhance Throughput Cellular™ (ETC®) protocol developed by Paradyne Corporation, Largo, Fla., U.S.A.

Nonetheless, even with a cellular-oriented protocol, other impairments limit the effective data rate over a cellular channel. One such impairment is the encoding scheme utilized over the communication link interconnecting a cell site transceiver and the mobile telecommunications switching office (MTSO). This link (also referred to as a carrier facility) is most typically a T1 trunk in the North American cellular system, and an E1 trunk in the European cellular system. In order to increase the bandwidth of the carrier facility, cellular service providers make use of voice compression encoding schemes such as adaptive differential pulse code modulation (ADPCM). For example, a T1 trunk with 24 DS0 slots can accommodate up to 48 ADPCM channels, where alternatively, the same T1 trunk can only accommodate 24 channels when utilizing pulse code modulation (PCM). Thus, the use of voice compression increases the capacity of the cellular network, and thereby reduces the number of T1 trunks necessary to connect each cell site transceiver to the MTSO. As appreciated by those knowledgeable in the art, this is an important concern of cellular service providers since each carrier facility, that is, each T1 trunk, has associated with it a substantial cost.

While compression schemes such as ADPCM have no discernible effect on voice transmissions, they do limit the maximum data rate for data transmission to approximately 9,600 bps. This is primary because voice compression schemes introduce noise into the data signal that cause the data modem at the MTSO to reduce its effective data rate via autorating, as is well known in the art. Moreover, the greater the compression of the signal, the greater the amount of noise introduced, and consequently, the lower the data rate. Therefore, cellular modems connected to a channel utilizing an encoding scheme with little to no compression such as PCM can presently achieve data rates up to 21,600 bps, a significant improvement over channels utilizing a voice compression encoding scheme such as ADPCM which limit the modem's data rate to approximately 9,600 bps. The problem still exist on how to harness this improved performance in data rates with uncompressed channels without dramatically reducing the capacity of the carrier facilities.

Presently, most cellular networks provide a mixture of compressed (i.e., ADPCM) and uncompressed (i.e., PCM) channels in the carrier facilities that are interconnecting the cell site transceiver and the MTSO. When a new user in a particular cell requires one of the channels as a carrier facility for communication, the MTSO typically uses a hunt group to locate and assign an open channel to that user. This is usually done in one of two methods. A first method is to assign the new user to the first open channel in the hunt group, that being the available channel with the lowest channel number. This is referred to as fixed order hunting. A second method is to assign the new user to the next sequential channel in a hunt group. This is referred to as rotary hunting. As is evident, neither of these methods provide any optimization of the uncompressed channels for data calls or the compressed channels for voice calls. All things considered, the probability that a data call would be routed to an uncompressed channel of the carrier facility using either method is uncontrollable, if not unpredictable.

Thus, a need exist in the industry for a system and method for maximizing the utilization of uncompressed channels for data calls and compressed channels for voice calls in order to increase the effective data rate in the cellular portion of the data connection and to improve the overall performance of the cellular network.

SUMMARY OF THE INVENTION

The present invention overcomes the inadequacies and deficiencies of the prior art as disclosed hereinbefore and as well known in the industry. The present invention provides for a channel routing manager that can be employed in a mobile telecommunications switching office (MTSO) of a cellular network for routing voice and data calls over a carrier facility that interconnects a cell site transceiver and the MTSO, where the carrier facility includes first and second channels that utilize first and second encoding methods, respectively, so as to be able to maximize data transmission speed over the carrier facility by routing data calls to the channels that utilize the encoding method that provides the fastest data rate. For purposes of disclosing the present invention, the carrier facility is a T1 trunk and the first and second encoding methods are adaptive differential pulse code modulation (ADPCM) and pulse code modulation (PCM), respectively. Thus, as would be obvious to those skilled in the art, it would be desirable in this example to route the voice calls to the first channels that utilize ADPCM encoding, and data calls to the second channels that utilize PCM encoding. However, it should be noted that the present invention is equally well suited for operation with other type carrier facilities utilizing more than one encoding scheme wherein it would be desirable to route certain type calls over channels that are utilizing a particular one of the encoding schemes.

In essence, the channel routing manager of the present invention comprises a hunt group mechanism that includes ADPCM and PCM channels, wherein the ADPCM channels are sorted together and the PCM channels are sorted together, and a control mechanism for routing voice calls to one of the ADPCM channels unless all of the ADPCM channels are busy, and then routing the voice calls to one of the PCM channels, and for routing data calls to one of the PCM channels unless all of the PCM channels are busy, and then routing the data calls to one of the ADPCM channels.

The channel routing manager further includes a routing code identifier for identifying data calls routed through the mobile switching center so that the data calls can be preferably routed onto a PCM channel in accordance with the present invention via routing logic of a control mechanism integrated with the channel routing manager. In addition, the channel routing manager can include a tracking mechanism associated with the control mechanism for tracking data calls during hand-offs between cells and within a cell so as to maximize the use of the PCM channels by data calls. This includes freeing a PCM channel by handing-off a voice call on a PCM channel to an ADPCM channel when an ADPCM channel becomes available.

In a first embodiment of the present invention, the hunt group mechanism comprises a dual-ended fixed order hunt group with the ADPCM channels of the carrier facility at one end of the hunt group and beginning with a lowest channel number, and with the PCM channels of the carrier facility at the other end of the hunt group and beginning with a highest channel number. Accordingly, the channel routing manager is able to maximize the utilization of the PCM channels for data calls by routing the voice calls to the lowest available channel and data calls to the highest available channel. This increases the overall efficiency of the cellular network by preferably placing the voice calls on the ADPCM channels, to maximize the number of calls the cell can support, and preferably placing the data calls on the PCM channels, thereby dynamically increasing the data rate of the cellular network.

Furthermore, it should be noted that in this first embodiment, a voice call may ultimately be routed to one of the PCM channels if all the ADPCM channels are busy, and a data call may be routed to one of the ADPCM channels if all of the PCM channels are busy. Though these are not optimum situations, the ADPCM channels are capable of carrying data calls and the PCM channels are capable of carrying voice calls. Therefore, none of the capacity of the carrier facility is sacrificed in optimizing the utilization of the PCM channels for data calls.

In a second embodiment, the hunt group mechanism comprises opposing first and second fixed order hunt groups. The first fixed order hunt group begins with the ADPCM channels and ends with the PCM channels and the second fixed order hunt group begins with the PCM channels and ends with the ADPCM channels. Accordingly, the channel routing mechanism routes voice calls to the first fixed order hunt group and data calls to the second fixed order hunt group. As with the first embodiment, this increases the overall efficiency of the cellular network by maximizing the placement of voice calls on the ADPCM channels and data calls on the PCM channels.

As with the first embodiment, voice calls may be routed to a PCM channel if all the ADPCM channels are busy, and conversely, data calls may be routed to a ADPCM channel if all the PCM channels are busy. Again, while this is not optimum, the capacity of carrier facility is not reduced.

In addition, the overall efficiency of the cellular network can be further improved by maximizing the number of PCM channels in the carrier facility up to the point of requiring an additional carrier facility. This effectively increases the speed of the data connections in the cellular network by increasing the likelihood that a data call will be routed to a PCM channel.

The present invention also provides for and can be conceptualized as a method for routing voice and data calls over a carrier facility that interconnects a cell site transceiver and a MTSO and that includes first and second channels which utilize first and second encoding methods, respectively. This routing method of the present invention comprises the following steps: determining if an incoming call is a voice call or a data call, routing voice calls to one of the ADPCM channels unless all of the ADPCM channels are busy and then routing the voice call to one of the PCM channels, and routing data calls to one of the PCM channels unless all of the PCM channels are busy and then routing the data calls to one of the ADPCM channels.

In a first embodiment of the above methodology, a step of sorting the ADPCM and PCM channels into a dual-fixed order hunt group with the ADPCM channels at a first end beginning with a lowest channel number and with the PCM channels at a second end beginning with a highest channel number is included. Accordingly, voice calls are routed to the lowest available channel and data calls are routed to the highest available channel in order to maximize the utilization of the PCM channels for data calls, and therefore, speed at which data is transmitted through the cellular network.

As an alternative, in a second embodiment of the above methodology, a step of sorting the ADPCM and PCM channels into opposing first and second fixed order hunt groups, wherein the first fixed order hunt group begins with the ADPCM channels and ends with the PCM channels and the second fixed order hunt groups begins with the PCM channels and ends with the ADPCM channels, is included. Accordingly, voice calls can be routed to the first fixed order hunt group and data calls can be routed to the second fixed order hunt group, thereby maximizing the utilization of the PCM channels for data calls so as to increase the speed at which data is transmitted through this cellular network.

Another additional step includes tracking the data calls so that during hand-offs the data calls can be routed to one of the PCM channels unless all of the PCM channels are busy and then the data calls can be routed to one of the ADPCM channels. In the context of this disclosure, a hand-off can occur between two cell or within a single cell.

The present invention provides numerous advantages over the routing schemes in the prior art, a few of which are delineated hereafter.

The channel routing system and method of the present invention enable data to be transmitted through a cellular network at a relatively higher speed than previously achieved in an analog cellular network.

The channel routing system and method of the present invention maximize the efficiency of a carrier facility in transmitting both data and voice calls thereover.

The channel routing system and method of the present invention provide for more efficient routing of a call during hand-offs.

Other features and advantages of the present invention will become apparent to one skilled in the art upon examination of the following drawings and detailed description. It is intended that all such additional feature and advantages being included herein within the scope of the present invention, as defined by the claims.

BRIEF DESCRIPTION OF THE DRAWINGS

The present invention can be better understood with reference to the following drawings. The elements of the drawings are not necessarily to scale, emphasis is instead being placed upon clearly illustrating the principles of the present invention. Further, like reference numerals designated corresponding parts throughout the said reviews.

DETAILED DESCRIPTION OF THE PREFERRED EMBODIMENT

The following description is at the best presently contemplating mode of carrying out the present invention in the context of routing data calls over pulse code modulation (PCM) channels of a carrier facility where the carrier facility includes both PCM and adaptive differential pulse code modulation (ADPCM) channels. The present invention maximizes the utilization of the PCM channels for data calls without reducing the carrier facility's capacity. However, as can be appreciated by one of ordinary skill in the art, the present invention is equally applicable for routing connections over a carrier facility having multiple channels utilizing two or more different encoding schemes, whereby it would be more desirable to route certain connections to channels utilizing one encoding scheme rather than channels utilizing another of the available encoding schemes. Thus, the present description is not to be taken in a limiting sense, but is made merely for the purpose of describing the general principles of the invention. The scope of the invention should be determined by referencing the appended claims.

I. Architecture of the Channel Routing Manager

Figure 1:
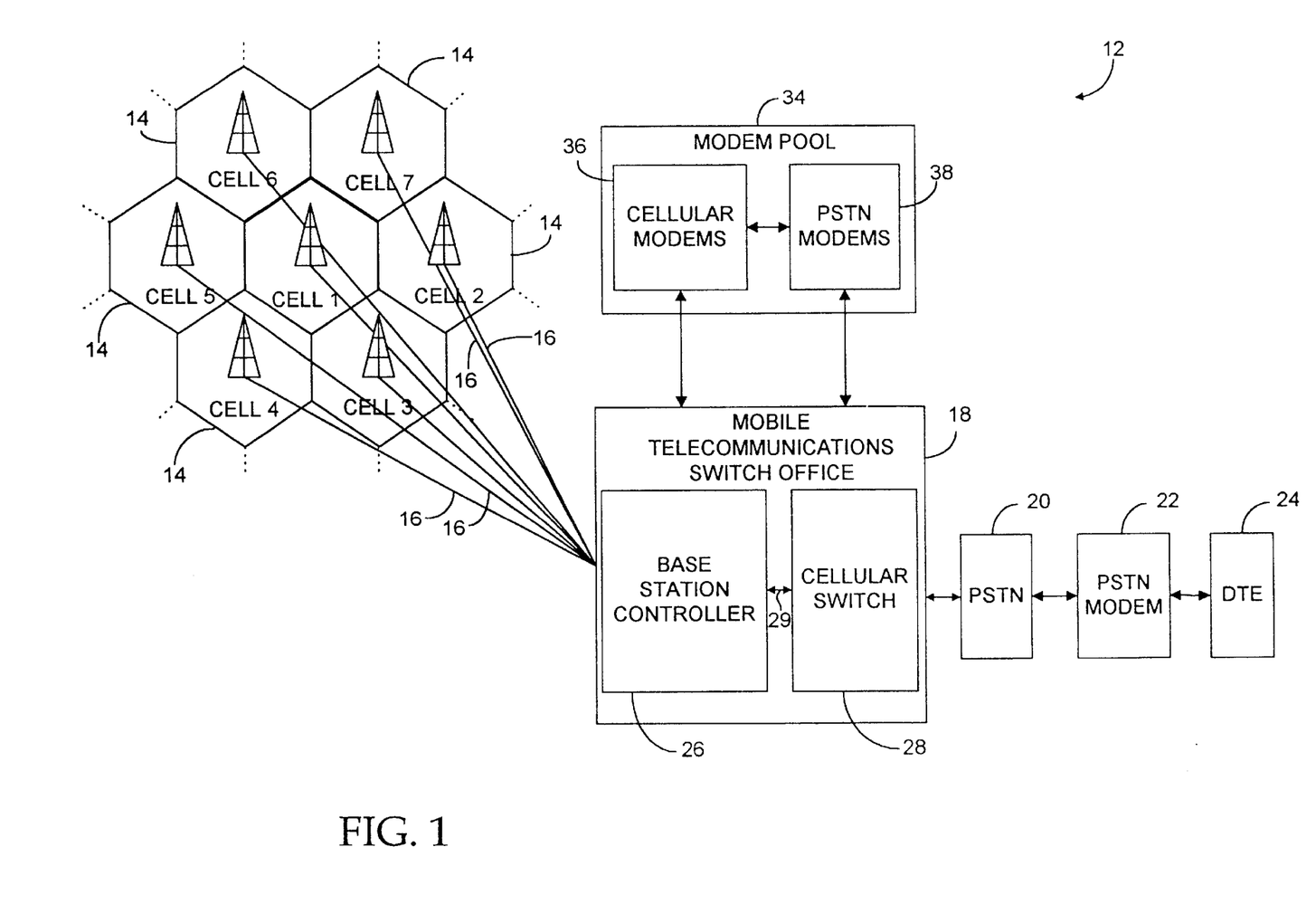
FIG. 1 is a block diagram of a mobile data communication system suitable for employing the present invention.

With reference now to the drawings, FIG. 1 shows a cellular communication network 12 suitable for employing the present invention. The cellular communication network 12 includes a plurality of cells 14 configured to cover a particular geographic area, as well known in the art. It should be understood that the shape and configuration of the cells 14 are merely exemplary of that which is commonly used in the industry, and does not constitute any part of the invention. The cells 14 in FIG. 1 are configured in a seven cell repeating pattern with each cell having one-seventh of the total number of channels of the cellular communication network 12. In today's North American cellular network, there are typically 420 channels reused in each seven cell pattern. Accordingly, each cell 14 has 60 channels allotted to it. A carrier facility 16 interconnects each cell 14 to a mobile telecommunications switching office (MTSO) 18. Each carrier facility 16 comprises a transmission media suited for transmitting a signal from each respective cell 14 to the mobile telecommunications switching office 18. For the purpose of disclosing the present invention, the carrier facilities 16 are T1 trunks, each having 24 DSO slots with at least one slot configured as a control channel and the remaining slots connected to a radio channel utilizing either ADPCM or PCM encoding for transmitting information. However, the present invention can be implemented with other transmission media, for example, T2, T3, E1, E2, E3, etc., that are suitable for interconnecting a cell 14 to the MTSO 18. Nonetheless, each carrier facility 16, regardless of its type, cost a significant amount of money which deters the cellular service providers from adding addition carrier facilities 16 unless absolutely necessary, for instance, to increase the cellular network bandwidth.

The MTSO 18 interconnects the cellular portion of the cellular communication network 12 to the public switch telephone network (PSTN) 20. The PSTN 20 provides a connection to a far-end PSTN modem 22 and data terminal equipment (DTE) 24, e.g., a personal computer, for completing data calls between a cellular custom in one of the cells 14 and the PSTN modem 22. This is, of course, merely one example of a data call over the cellular communication network 12, and many variations of such a data call exist and are supported by the present invention in accordance with the teachings herein.

In addition, the MTSO 18 includes a base station controller 26 and a cellular switch 28 that are interconnected by a link 29. The base station controller 26 essentially interfaces the cellular portion of the network 12 with the cellular switch 28. The base station controller 26 performs the mobility management functions of the MTSO 18, for instance, channel routing functions and hand-off functions. Thus, the cellular switch 28 is kept insulated from changes in a call arising from the mobility of a customer or arising from bandwidth management (i.e., hand-offs initiated by the base station controller 26 for bandwidth utilization between cells). The cellular switch 28 interfaces with the PSTN 20 via a link 32 that may include links to a variety of long distance exchange carriers and/or a local exchange carrier, as is well known in the art.

A modem pool 34 is also provided for handling data calls in the cellular communication network 12. Though not necessary for the operation of the present invention, the modem pool 34 includes a bank of cellular modems 36 configured for operating with a specialized cellular data protocol such as ETC® for improving the data connection over the adverse cellular link. A bank of PSTN modems 38 that interfaces with the cellular modems 36 is also included in the modem pool 34 for transmission over the PSTN 20 with standard data protocols such as those defined by the International Telecommunication Union (ITU) Consultative Committee on International Telegraphy and Telephony (CCITT). Thus, once the base station identifies a call as a data call, the call can be passed to the modem pool 34, and then onto the PSTN 20 where the call can terminate at the far-end PSTN modem 22.

Though the cellular modems 36 are not required to complete a data call through the MTSO 18, a routing code that is employed for cellular data calls, such as ETC®, is necessary for the operation of the channel routing manager 10 so that the MTSO 18 can distinguish between data and voice calls, as described in greater detail below.

Figure 2:
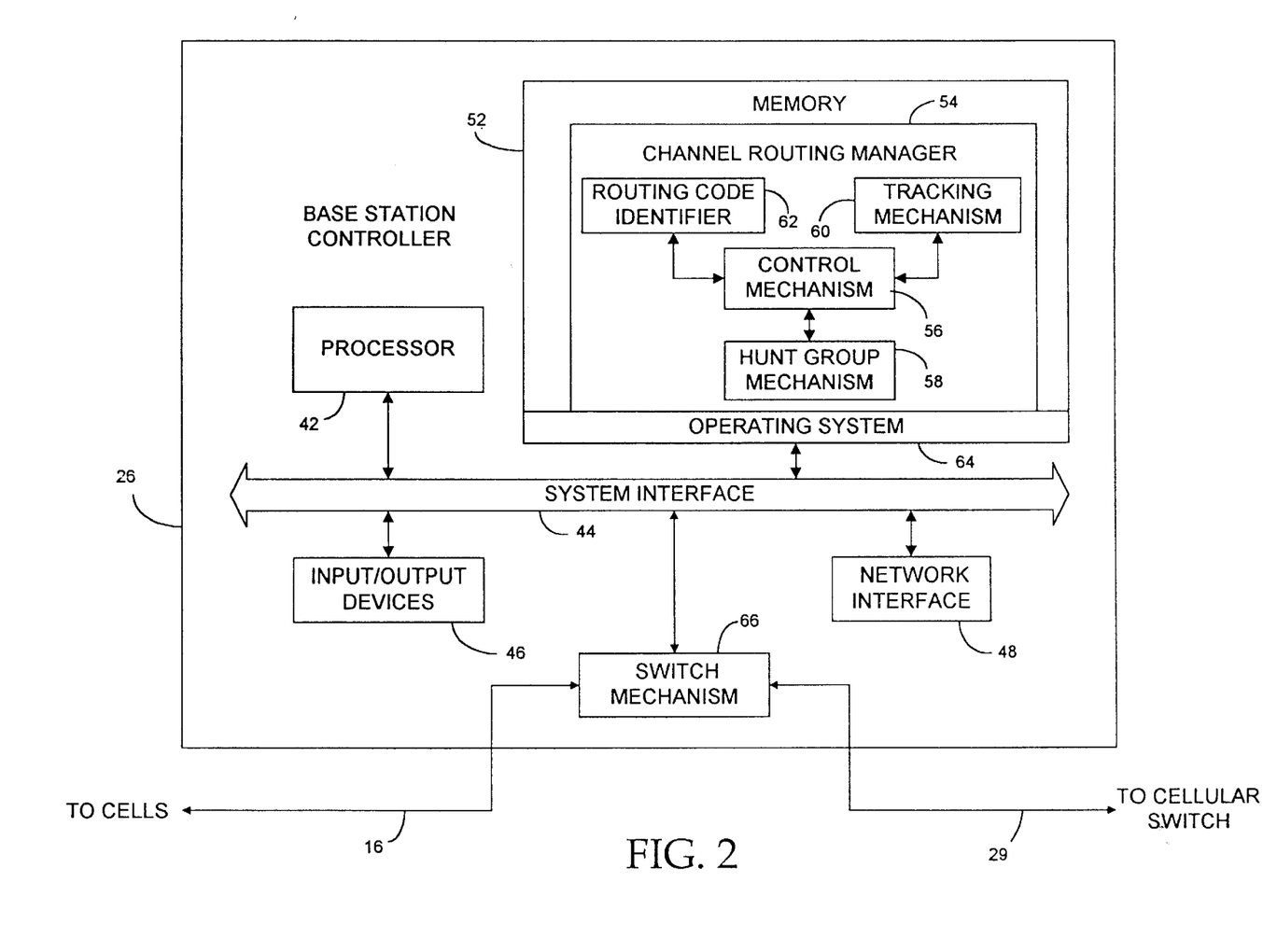
FIG. 2 is a high level block diagram of the base station controller of FIG. 1, including the channel routing manager of the present invention.

With reference now to FIG. 2, the architecture and functionality of the base station controller 26 is illustrated. The base station controller 26 comprises a conventional processor 42 that communicates to the other elements within the base station controller 26 via a system interface 44. Input/output devices 46, such as a keyboard, mouse, and/or monitor, are used to input data to the base station controller 26 and output data to the user. A network interface 48 is provided to connect the base station controller 26 to other elements within the cellular communication network 12. A memory 52 within the base station controller 26 stores a channel routing manager 54 in accordance with the present invention as executable instructions, i.e., as a computer-readable program, that causes the bas station controller 26 to operate in a particular fashion as described in detail below. The channel routing manager 54 includes a control mechanism 56, a hunt group mechanism 58, a tracking mechanism 60, and a routing code identifier 62. Further, an operating system 64 is provided for running and managing programs, e.g., the channel routing manager 54. Lastly, a switch mechanism 66 is provided as an integral part of the base station controller 26 for connecting calls on the carrier facilities 16 to the appropriate channel on the link 29 that interconnects the base station controller to the cellular switch 28 (FIG. 1). The switch mechanism 66 operates under the control of the control mechanism 56 of the channel routing manager 54.

Figure 3:
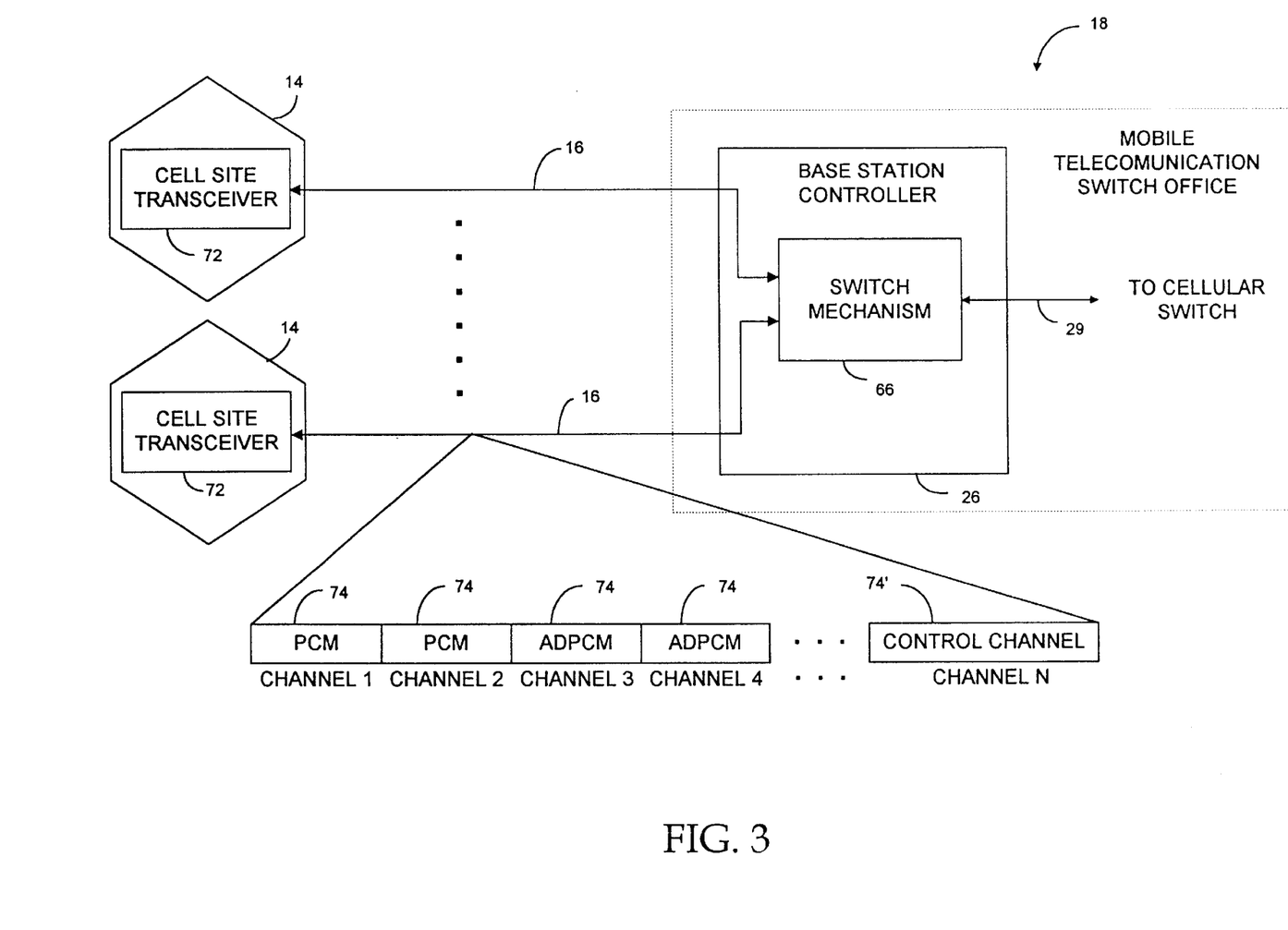
FIG. 3 is a high level block diagram of the carrier facility interconnecting the respective cells and the base station controller in FIG. 1.

With reference now to FIG. 3, an illustration of a carrier facility 16 interconnecting each cell 14 and the base station controller 26 is provided. At each cell 14, a cell site transceiver 72 receives and transmits signals to and from the cellular customers within its respective cell 14. The cell site transceivers 72 include a bank of radios (not shown), with one radio for each channel of the carrier facility 16. In the embodiment chosen for illustrating the preferred embodiment, the radios are configured to utilize either ADPCM or PCM encoding. Thus, when a new call arrives, the base channel routing manager 54 determines which channel of the carrier facility 16 to place the call on based upon the type of call, i.e., voice or data, and the encoding scheme of the radio associated with each channel. As shown in FIG. 3, the channels 74 of the carrier facility are designated as either PCM or ADPCM channels except for channel 74' which is the control channel. The control channel 74' allows the cell site transceiver 72 and the base station controller 26 to communicate to each other such information as routing codes of new calls, call routing assignments, handoffs, etc.

Referring back to FIG. 2, the control mechanism 56 of the channel routing manager 54 is configured to receive control information from the hunt group mechanism 58, the tracking mechanism 60, and the routing code identifier 62, and to direct the operation of the switch mechanism 66 in the manner described below. In particular, the hunt group mechanism 58 of the channel routing manager 54 sorts the channels of the carrier facility 16 into one or more hunts groups that are used by the control mechanism 56 to determine which channel of the carrier facility to place the new calls or to place existing calls being handed-off. For purposes of disclosing the present invention, a first and second embodiment of the hunt group mechanism 58 are provided.

The first embodiment of the hunt group mechanism 58 comprises a dual-ended fixed order hunt group with the ADPCM channels sorted together at one end of the hunt group and beginning with a lowest channel number. The PCM channels are likewise sorted together at the opposite end of the hunt group and beginning with the highest channel number. Thus, voice calls are routed to the available channel with the lowest channel number so as to maximize the likelihood that the voice call will be routed to a ADPCM channel. Furthermore, the data calls are routed to the available channel with the highest channel number so as to maximize the likelihood that the data calls will be routed to a PCM channel.

The second embodiment of the hunt group mechanism 58 comprises first and second fixed ordered hunt groups. The first fixed ordered hunt group comprises the ADPCM channels sorted together at the beginning or low end of the hunt group and the PCM channels sorted together at the opposite end of the hunt group. The second fixed order hunt group comprises the PCM channels sorted together at the beginning or low end of the hunt group and the ADPCM channels sorted together at the opposite end of the hunt group. Thus, the voice calls are routed by the control mechanism to the lowest available channel in the first fixed ordered hunt group so as to maximize the likelihood that the voice calls will be routed to an ADPCM channel. Furthermore, the data calls are routed by the control mechanism to the lowest available channel in the second fixed ordered hunt group so as to maximize the likelihood that the data calls will be routed to a PCM channel.

Worth noting is that in either of the embodiments of the hunt group mechanism 58, none of the capacity of the carrier facility is lost. If all the preferred channel types are busy, a new call merely rolls over to one of the other channel types. This is particularly important since full utilization of a carrier facility's capacity reduces the number of carrier facilities 16 required for servicing the cell.

The tracking mechanism 60 of the channel routing manager 54 further increases the efficiency of the cellular communication network by tracking data calls so that data calls that have been routed to ADPCM channels can be handed-off to an PCM channel when one becomes available. In addition, The voice calls routed to PCM channels are tracked so that the voice calls on PCM channels can be handed-off to an ADPCM channel when one becomes available. This further maximizes the utilization of the PCM channels for data calls and the ADPCM channels for voice calls, thereby increasing the efficiency of the cellular communication network 12.

The routing code identifier 62 of the channel routing manager 54 performs the function of identifying data calls. This is an important aspect of the present invention because the control mechanism needs to know which calls are data calls and which calls are voice calls so that the respective call types can be appropriately routed according to the present invention. In the preferred embodiment, the routing code identifier detects a *DATA (e.g., *3282) prefix associated with calls using the ETC® protocol. However, it should be noted that the present invention is not to be limited to *DATA calls, but that any routing code in the protocol of a cellular call that can identify it as a data call is suitable. For example, a Modem Signal Detector is a device that can distinguish between the spectral characteristics of modems and the spectral characteristics of voice. A Modem Signal Detector can detect modem signals at any time during a call, eliminating the need for a *DATA identifier at the start of call. Modem Signal Detectors are well known in the art for such uses as detecting modem and fax signals on transoceanic calls, for example.

By maximizing the utilization of the PCM channels for data calls and the ADPCM channels for voice calls, the present invention allows cellular service providers to make full use of the capacity of the carrier facilities while supporting two or more different encoding schemes. This essentially reduces the number of carrier facilities that the cellular service provider must install which is desirable for a variety of reason as discussed in the Background section. In fact, the division of PCM and ADPCM channels on a single T1 trunk can be defined by Equation (1) below so that the greatest number of PCM channels are on the carrier facility, up to the point where any additional channels would require an additional carrier facility:

$$p \leq (2*N)*INT[C/(2*N)] - C, \text{ when } p \leq C \qquad (1)$$

where p is the number of PCM channels N is the number of DSO channels (64 kbps channels) on the carrier facility, and C is the number of radio channels on the carrier facility. The integer (INT) function returns the next highest integer for fractional values. Thus, a carrier facility having p channels utilizing PCM encoding will be able to dynamically increase the data rate over the carrier facility when the channel routing is performed in accordance with the present invention.

II. Operation of the Channel Routing Manager

Figure 4:
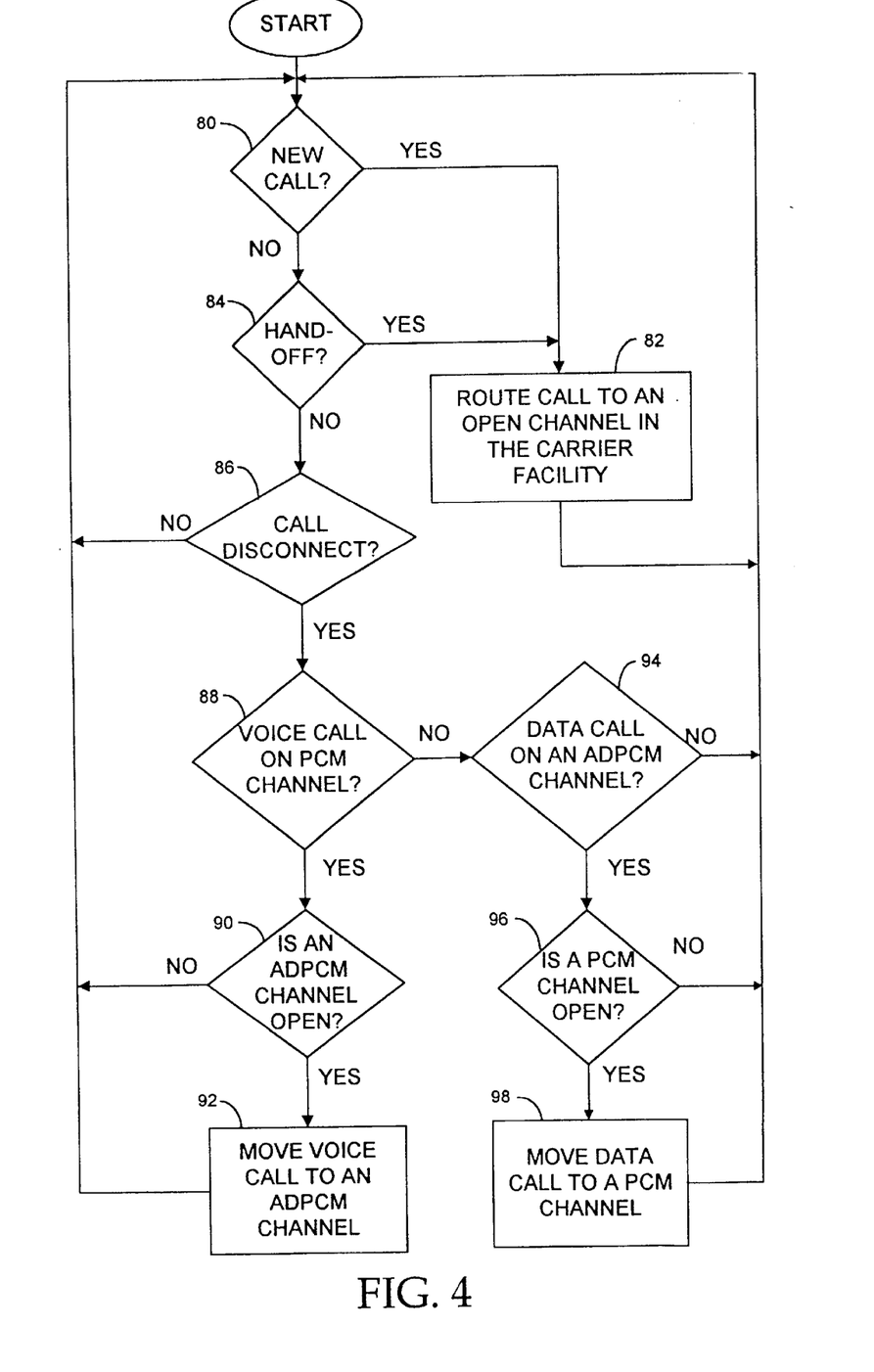
FIG. 4 is a flowchart of the operation of the channel routing manager of FIG. 2 in accordance with the present invention.

The operation of the present invention is illustrated by the flowchart of FIG. 4. The channel routing manager 54 operates in a continuous fashion as described below to maximize the utilization of the PCM and ADPCM channels of the carrier facilities 16. Initially, the channel routing manager 54 determines, at block 80, if there is a new call in one of the cells 14. If there is a new call, then that call is routed to an open channel 74 of the carrier facility for that cell in accordance with the present invention, as indicated at block 82 and as more fully discussed below. If it is determined at block 80 that there is not a new call, then block 84 determines if there is a call hand-off in one of the cells 14. If there is a call hand-off, then the call being handed-off is routed to an open channel 74 of the carrier facility for that cell in accordance with the present invention, as indicated at block 82. Once the new or handed-off call is routed to a channel 74 on the carrier facility 16, the channel routing manager 54 loops back to the beginning of the process and starts again.

If it is determined at block 84 that there is not a hand-off, then the channel routing manager 54 determines at block 86 if there is a call disconnect. If not, then the channel routing manager 54 begins the process again. If so, however, then the channel routing manager 54 looks to see if the channel opened by the call disconnect can be utilized to further maximize the utilization of the PCM channels for data calls and the ADPCM channels for voice calls in the following manner.

At block 88, the channel routing manager 54 determines if there is a voice call on a PCM channel. If there is, then it is determined at block 90 if there is an ADPCM channel open so that the voice call can be handed-off to the ADPCM channel in order to maximize the bandwidth of the carrier. If there is not an open ADPCM channel then the process begins again. However, if at block 90 it is determined that there is an open ADPCM channel, then the voice call on a PCM channel is moved at block 92 to an ADPCM channel in order to free up a PCM channel for a data call. Next, the channel routing manager 54 loops back to the beginning of the process and starts again.

If it is determined at block 88 that there is not a voice call on a PCM channel, then at block 94 it is determined if there is a data call on an ADPCM channel. If there is not, then the process begins again. However, if there is a data call on an ADPCM channel, then it is determined at block 96 if there is a PCM channel open so that the data call can be handed-off from an ADPCM to a PCM channel. If not, the process begins again. If there is an open PCM channel then at block 98 the data call on the ADPCM channel is moved to the open PCM channel in order to maximize the data rate of that call. Next, the channel routing manager 54 loops back to the beginning of the process and starts again.

Figure 5:
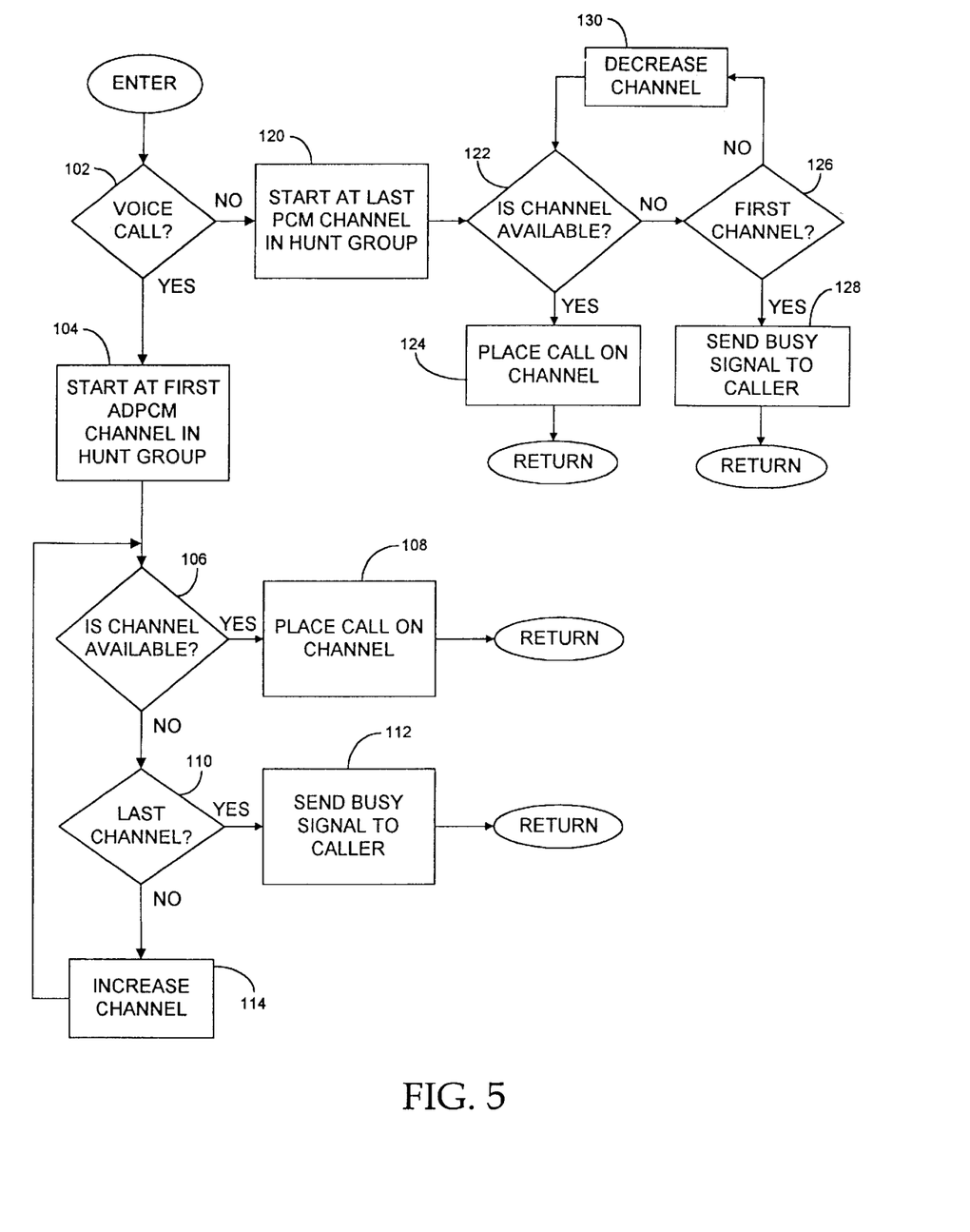
FIGS. 5 and 6 are flowcharts of respective alternative embodiments of the routing step of FIG. 4.

With reference to FIG. 5, a first embodiment of the routing performed by the channel routing manager 54 at block 82 of FIG. 4 is provided. In this first embodiment, the hunt group mechanism comprises a dual-ended fixed order hunt group with the ADPCM channels sorted together at one end of the hunt group and beginning with the lowest channel number, and the PCM channels sorted together at the opposite end of the hunt group beginning with the highest channel number. Initially, at block 102, it is determined if the call is a voice call so that the channel routing manager 54 knows whether to start looking for open channels at the beginning or end of the hunt group.

If the call is a voice call, then block 104 starts at the first ADPCM channel in the hunt group, that is, the channel with the lowest channel number. At block 106, it is determined if that channel is available. If that channel is available, then at block 108 the call is placed on the channel and the process begins again. If that channel is not available, then it is determined at block 110 whether that channel is the last channel in the hunt group. This determination is made because all the channels may be busy, and therefore, the carrier facility is unable to take another call. In such a case, a busy signal is sent to the user at block 112. However, if that is not the last channel, then the channel number is increased at block 114 so that it can be determined if the next channel is available at block 106. Accordingly, in the case of a voice call, the channel routing manager 54 begins at the channel with the lowest channel number and sequentially steps through all the channels in increasing order until an open channel is found or all the channels have been checked. Since all the ADPCM channels are sorted together at the low end of the hunt group, the probability of a voice call being placed on an ADPCM channel is maximized. Moreover, none of the capacity of the carrier facility is wasted because, if all the ADPCM channel are busy, then the channel routing manager 54 will check the PCM channels for an open channel.

If the call is not a voice call, that is, the call is a data call, then block 120 starts at the last PCM channel in the hunt group, that is, the channel with the highest channel number. At block 122, it is determined if that channel is available. If that channel is available, then at block 124 the call is placed on the channel and the process begins again. If that channel is not available, then it is determined at block 126 whether that channel is the first channel in the hunt group. This determination is made in case all the channels have been busy, and therefore, the carrier facility is unable to take another call. In such a case, a busy signal is sent to the caller at block 128. However, if that channel is not the last channel, then the channel number is decreased at block 130 so that it can be determined if the next channel is available at block 122. Accordingly, in the case of a data call, the channel routing manager 54 begins at the channel with the highest channel number and sequentially steps through all the channels in an decreasing manner until an open channel is found or all the channels have been checked. Since all the PCM channels are sorted together at the high end of the hunt group, the probability of a voice call being placed on an PCM channel is maximized. Moreover, none of the capacity of the carrier facility is wasted since, if all the PCM channel are busy, then channel routing manager 54 will check the ADPCM channels for an open channel.

Figure 6:
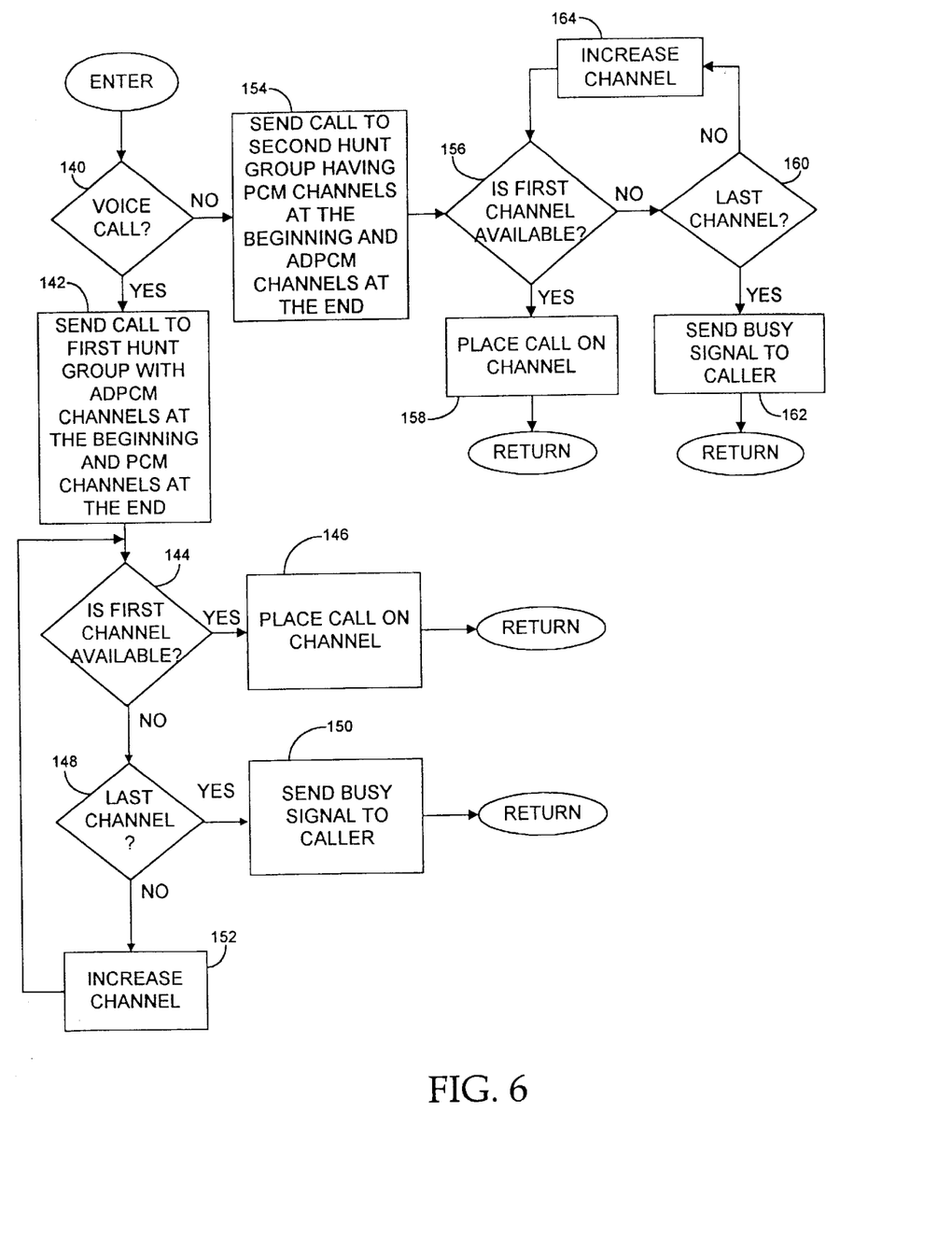

With reference now to FIG. 6, a second embodiment of the routing performed channel routing manager 54 at block 82 of FIG. 4 is provided. In this second embodiment, the hunt group mechanism comprises opposing first and second fixed order hunt groups, wherein the first fixed order hunt group begins with the ADPCM channels and ends with the PCM channels, and the second fixed order hunt group begins with the PCM channels and ends with the ADPCM channels. Initially, at block 140, it is determined if the call is a voice or data call so that the channel routing manager 54 knows whether to send the call to the first or second fixed order hunt group.

If the call is a voice call, then at block 142 the call is sent to the first fixed order hunt group with the ADPCM channels at the beginning and the PCM channels at the end. Next, at block 144, it is determined if the first channel of that hunt group is available. If the channel is available, the call is placed on that channel at block 146 and the process begins again. If the channel is not available at block 144, then it is determined at block 148 whether that channel is the last one in the hunt group. If it is, then a busy signal is sent to the user at block 150 because that means that all the channels have been checked and all are busy. However, if it is not the last channel, then the channel number is increased at block 152 so that it can be determined at block 144 if the next channel is available. In a sequential fashion, the channel routing manager 54 steps through all the channels in the first hunt group, beginning with the ADPCM channels and then the PCM channels until an available channel is located or all the channels of the carrier facility have been checked. Thus, the probability of a voice call being placed on an ADPCM channel is maximized. Moreover, none of the capacity of the carrier facility is wasted because, if all the ADPCM channel are busy, then the channel routing manager 54 will check the PCM channels for an open channel.

If the call is a data call, then at block 154 the call is sent to the second fixed order hunt group with the PCM channels at the beginning and the ADPCM channels at the end. Next, at block 156, it is determined if the first channel of that hunt group is available. If the channel is available, then the call is placed on that channel at block 158 and the process begins again. If the channel is not available at block 156, then it is determined at block 160 whether that channel is the last one in the hunt group. If it is, then a busy signal is sent to the caller at block 150 because all the channels have been checked and all are busy. However, if that is not the last channel then the channel number is increased at block 164 so that it can be determined if the next channel is available, at block 156. Accordingly, in a sequential fashion, the channel routing manager 54 steps through all the channels in the second hunt group, beginning with the PCM channels first and then the ADPCM channels until an available channel is located or all the channels of the carrier facility have been checked. Thus, the probability of a data call being placed on a PCM channel is maximized. Moreover, none of the capacity of the carrier facility is wasted because, if all the PCM channel are busy, then the channel routing manager 54 will check the ADPCM channels for an open channel.

In concluding the detailed description, it should be noted that it will be obvious to those skilled in the art that many variations and modifications may be made to the preferred embodiment without substantially departing from the principles of the invention. All such variations and modifications are intended to be included herein within the scope of the present invention, as set forth in the following claims. Further, in the claims hereafter, the corresponding structures, materials, acts, equivalent of all means or step plus function elements are intended to include any structures, materials, or acts for performing the recited functions in combination with other claimed elements as specifically claimed.

Wherefore the following is claimed:

1. A channel routing manager that is employed by a mobile telecommunications switching office for routing voice and data calls over a carrier facility interconnecting a cell site transceiver to said mobile cellular switch and including first and second channels that utilize first and second encoding methods, respectively, the channel routing manager comprising:

a hunt group mechanism including said first channels and said second channels, and wherein said first channels are sorted together and said second channels are sorted together; and a control mechanism for routing a voice call to one of said first channels unless all said first channels are busy, and then routing said voice call to one of said second channels, and for routing a data call to one of said second channels unless all said second channels are busy, and then routing said data call to one of said first channels, wherein said carrier facility includes a maximum number of said second channels without requiring an additional carrier facility and said number of said second channels is defined by the following equation:

$$p \leq (2*N)*INT[C/(2*N)] - C, \text{ when } p \leq C$$

where p is said number of said second channels, C is a number of radio channels on said carrier facility, and N is a numeral 64 kbps channel on said carrier facility.

2. The channel routing manager of claim 1, wherein said first encoding method is adaptive differential pulse code modulation.

3. The channel routing manager of claim 1, wherein said second encoding method is pulse code modulation.

4. The channel routing manager of claim 1, wherein said carrier facility comprises an T1 trunk.

5. The channel routing manager of claim 1, wherein said carrier facility comprises an E1 trunk.

6. The channel routing manager of claim 1, further including a routing code identifier at said mobile telecommunications switching office for identifying said data calls.

7. The channel routing manager of claim 1, further including tracking means in said mobile cellular switch for tracking said data calls so that during a hand-off said control means can route said data calls to one of said second channels unless all said second channels are busy, and then routing said data call to one of said first channels.

8. A method for routing voice and data calls over a carrier facility interconnecting a cell site transceiver to a mobile cellular switch and including first and second channels that utilize first and second encoding methods, respectively, the method comprising the steps of:

determining if an incoming call is a voice call or a data call;

routing voice calls to one of said first channels unless all said first channels are busy, and then routing said voice calls to one of said second channels;

routing data calls to one of said second channels unless all said second channels are busy, and then routing said data calls to one of said first channels;

tracking said data calls so that during hand-offs said data calls are routed to one of said second channels unless all said second channels are busy, and then routing said data call to one of said first channels; and determining a number of second channels in said carrier facility in accordance with the following equation:

$$p \leq (2*N)*INT[C/(2*N)] - C, \text{ when } p \leq C$$

where p is said number of said second channels, C is a number of radio channels on said carrier facility, and N is a numeral 64 kbps channel on said carrier facility.

9. The method of claim 8, further including the step of sorting said first and second channels into a dual-ended fixed order hunt group with said first channels at a first end beginning with a lowest channel number and with said second channels at a second end beginning with a highest channel number, whereby said voice call is routed to a lowest available channel and said data call is routed to a highest available channel.

10. The method of claim 8, further including the step of sorting said first and second channels into opposing first and second fixed order hunt groups, wherein said first fixed order hunt group begins with said first channels and ends with said second channels and said second fixed order hunt group begins with said second channels and ends with said first channels, whereby said voice call is routed to said first fixed order hunt group and said data call is routed to said second fixed order hunt group.

11. The method of claim 8, wherein said first method is adaptive differential pulse code modulation.

12. The method of claim 8, wherein said second method is pulse code modulation.

13. The method of claim 8, wherein said carrier facility comprises a T1 trunk.

14. The method of claim 8, wherein said carrier facility comprises an E1 trunk.

15. The method of claim 8, further including the step of determining a maximum number of said second channels without requiring an additional carrier facility.

16. A channel routing manager that is employed by an electronic switch for routing a first call type having a first protocol and a second call type having a second protocol over a first media and a second media shared by said first and second call types, comprising:

hunt group mechanism including said first media and said second media, and wherein channels of said first media are sorted together and channels of said second media are sorted together; and control mechanism for routing said first call type to said channels of said first media unless said first media is busy, and then routing said first call type to said channels of said second media, and for routing said second call type to said channels of said second media unless said second media is busy, and then routing said second call types to said channels of said first media, wherein said hunt group mechanism comprises a dual-ended fixed order hunt group with said channels of said first media at a first end beginning with a lowest channel number and with said channels of said second media at a second end beginning with a highest channel number, wherein said control mechanism is configured to route said first call type to a lowest available channel and to route said second call type to a highest available channel.

17. A channel routing manager that is employed by an electronic switch for routing a first call type having a first protocol and a second call type having a second protocol over a first media and a second media shared by said first and second call types, comprising:

hunt group mechanism including said first media and said second media, and wherein channels of said first media are sorted together and channels of said second media are sorted together; and control mechanism for routing said first call type to said channels of said first media unless said first media is busy, and then routing said first call type to said channels of said second media, and for routing said second call type to said channels of said second media unless said second media is busy, and then routing said second call types to said channels of said first media, wherein said hunt group mechanism comprises opposing first and second fixed order hunt groups, said first fixed order hunt group beginning with said channels of said first media and ending with said second channels of said second media and said second fixed order hunt group beginning with said channels of said second media and ending with said channels of said first media, whereby said first call type is routed to said first fixed order hunt group and said second call type is routed to said second fixed order hunt group.

18. A channel routing manager that is employed by a mobile telecommunications switching office for routing voice and data calls over a carrier facility interconnecting a cell site transceiver to a mobile cellular switch and including first and second channels that utilize first and second encoding methods, respectively, the channel routing manager comprising:

a hunt group mechanism including said first channels and said second channels, and wherein said first channels are sorted together and said second channels are sorted together; and a control mechanism for routing a voice call to one of said first channels unless all said first channels are busy, and then routing said voice call to one of said second channels, and for routing a data call to one of said second channels unless all said second channels are busy, and then routing said data call to one of said first channels, wherein said hunt group mechanism comprises a dual-ended fixed order hunt group with said first channels at a first end beginning with a lowest channel number and with said second channels at a second end beginning with a highest channel number, wherein said control mechanism is configured to route said voice call to a lowest available channel and to route said data call to a highest available channel.

19. A channel routing manager that is employed by a mobile telecommunications switching office for routing voice and data calls over a carrier facility interconnecting a cell site transceiver to a mobile cellular switch and including first and second channels that utilize first and second encoding methods, respectively, the channel routing manager comprising:

a hunt group mechanism including said first channels and said second channels, and wherein said first channels are sorted together and said second channels are sorted together; and a control mechanism for routing a voice call to one of said first channels unless all said first channels are busy, and then routing said voice call to one of said second channels, and for routing a data call to one of said second channels unless all said second channels are busy, and then routing said data call to one of said first channels, wherein said hunt group mechanism comprises opposing first and second fixed order hunt groups, said first fixed order hunt group beginning with said first channels and ending with said second channels, said second fixed order hunt group beginning with said second channels and ending with said first channels, whereby said voice call is routed to said first fixed order hunt group and said data call is routed to said second fixed order hunt group.

20. The system of claim 19, further comprising a tracking mechanism configured to track a voice call being routed to said one of said second channels, said tracking mechanism further configured to determine when said one of said first channels becomes available and to route said voice call to said one of said first channels in response to said one of said first channels becoming available.

21. A channel routing manager that is employed by a mobile telecommunications switching office for routing voice and data calls over a carrier facility interconnecting a cell site transceiver to a mobile cellular switch and including first and second channels that utilize first and second encoding methods, respectively, the channel routing manager comprising:

hunt group mechanism including said first channels and said second channels, and wherein said first channels are sorted together and said second channels are sorted together; and     a control mechanism for routing a voice call to one of said first channels unless all said first channels are busy, and then routing said voice call to one of said second channels, and for routing a data call to one of said second channels unless all said second channels are busy, and then routing said data call to one of said first channels; and     a tracking mechanism configured to track said voice call when said voice call is being routed to said one of said second channels, said tracking mechanism further configured to determine when said one of said first channels becomes available and to route said voice call to said one of said first channels in response to said one of said first channels becoming available.

22. The channel routing manager of claim 21, wherein said tracking mechanism is further configured to track said data call when said data call is being routed to said one of said first channels, said tracking mechanism further configured to determine when said one of said second channels becomes available and to route said data call to said one of said second channels in response to said one of said second channels becoming available.

23. The channel routing manager of claim 21, wherein said hunt group mechanism comprises a dual-ended fixed order hunt group having a first end and a second end, each of said first channels located at said first end and each of said second channels located at said second end.

24. A method for routing voice and data calls over of a carrier facility interconnecting a cell site transceiver to a mobile cellular switch and including first and second channels that utilize first and second encoding methods, respectively, the method comprising the steps of:

receiving a plurality of incoming calls;

determining whether each of said incoming calls is a voice call or a data call;

routing one of said calls to one of said first channels in response to a determination that said one call is a voice call unless all said first channels are busy, and then routing said one call to one of said second channels;

routing another one of said calls to said one of said second channels in response to a determination that said other one of said calls is a data call unless all said second channels are busy, and then routing said other one of said calls to one of said first channels;

sorting said channels from a lowest channel to a highest channel;

forming a first group of channels;

forming a second group of channels where each channel of said second group is higher than every channel of said first group;

assigning each of said first channels to one of said groups; and     assigning each of said second channels to the other of said groups.

25. The method of claim 24, further comprising the steps of:

selecting one of said channels by stepping through said channels from said lowest channel to said highest channel until an available channel is discovered in response to one of said determinations; and     selecting one of said channels by stepping through said channels from said highest channel to said lowest channels until an available channel is discovered in response to the other one of said determinations.

\* \* \* \* \*